US008682062B2

(12) United States Patent
Kim et al.

(10) Patent No.: US 8,682,062 B2
(45) Date of Patent: Mar. 25, 2014

(54) 3 DIMENSION TRACKING SYSTEM FOR SURGERY SIMULATION AND LOCALIZATION SENSING METHOD USING THE SAME

(75) Inventors: Young Jun Kim, Seoul (KR); Sang Kyun Shin, Seoul (KR); Se Hyung Park, Seoul (KR); Deuk Hee Lee, Seoul (KR); Lae Hyun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 300 days.

(21) Appl. No.: 13/248,764

(22) Filed: Sep. 29, 2011

(65) Prior Publication Data

US 2012/0082342 A1    Apr. 5, 2012

(30) Foreign Application Priority Data

Oct. 4, 2010  (KR) ........................ 10-2010-0096480

(51) Int. Cl.
    *G06K 9/00*    (2006.01)
(52) U.S. Cl.
    USPC ......................................... 382/154
(58) Field of Classification Search
    None
    See application file for complete search history.

(56) References Cited

U.S. PATENT DOCUMENTS

| 7,756,244 | B2 * | 7/2010 | Mostafavi | 378/20 |
| 2004/0138556 | A1 * | 7/2004 | Cosman | 600/424 |
| 2007/0081695 | A1 * | 4/2007 | Foxlin et al. | 382/103 |
| 2010/0177163 | A1 * | 7/2010 | Yang et al. | 348/45 |
| 2011/0015521 | A1 * | 1/2011 | Faul | 600/426 |
| 2011/0130761 | A1 * | 6/2011 | Plaskos et al. | 606/87 |

FOREIGN PATENT DOCUMENTS

| KR | 10-2003-0060492 A | 7/2003 |
| KR | 10-2007-0078152 A | 6/2009 |
| KR | 10-2009-0057463 A | 6/2009 |
| KR | 10-2010-0098055 A | 6/2010 |

* cited by examiner

*Primary Examiner* — Vikkram Bali
(74) *Attorney, Agent, or Firm* — Fenwick & West LLP

(57) ABSTRACT

The 3-dimensional tracking system according to the present disclosure includes: a photographing unit for photographing an object; a recognizing unit for recognizing a marker attached to the object by binarizing an image of the object photographed by the photographing unit; an extracting unit for extracting a 2-dimensional coordinate of the marker recognized by the recognizing unit; and a calculating unit for calculating a 3-dimensional coordinate from the 2-dimensional coordinate of the marker by using an intrinsic parameter of the photographing unit.

9 Claims, 4 Drawing Sheets

_US 8,682,062 B2_

3 DIMENSION TRACKING SYSTEM FOR SURGERY SIMULATION AND LOCALIZATION SENSING METHOD USING THE SAME

CROSS-REFERENCE TO RELATED APPLICATION

This application claims priority to Korean Patent Application No. 10-2010-0096480, filed on Oct. 4, 2010, and all the benefits accruing therefrom under 35 U.S.C. §119, the contents of which in its entirety are herein incorporated by reference.

BACKGROUND

1. Field

The present disclosure relates to a 3-dimensional tracking system for tracking a 3-dimensional location of a surgical instrument by using a camera, and a localization sensing method using the same.

2. Description of the Related Art

The increase of computing ability of computers and the development of hardware technologies such as improved camera performance lead to the development of computer vision technology. The computer vision technology may be applied to medical simulation to provide surgeons with efficient and safe medical training and to allow surgeons to be trained in preparation to surgical operations or various medical practices. Recently, minimal invasive surgeries are used more and more in order to shorten the operating time and the recovery time of a patient who has received a laparoscopic surgery. The minimal invasive surgeries use the computer vision technology. In the related art, an encoder or magnetic sensor is used to estimate a location, which increases costs of constructing the system and makes the configuration of the system complicated.

SUMMARY

The present disclosure is directed to providing a 3-dimensional tracking system for tracking a 3-dimensional location of a surgical instrument by using a camera, and a localization sensing method using the same.

In one aspect, there is provided a 3-dimensional tracking system, which includes: a photographing unit for photographing an object; a recognizing unit for recognizing a marker attached to the object by binarizing an image of the object photographed by the photographing unit; an extracting unit for extracting a 2-dimensional coordinate of the marker recognized by the recognizing unit; and a calculating unit for calculating a 3-dimensional coordinate from the 2-dimensional coordinate of the marker by using an intrinsic parameter of the photographing unit.

The calculating unit may calculate the 3-dimensional coordinate by using a 3-dimensional location vector or 3-dimensional direction vector of the marker attached to the object.

The object may be a rod-shaped instrument, and the calculating unit may calculate a 3-dimensional coordinate from 2-dimensional coordinates of three or more markers attached to the object.

The object may be a rod-shaped instrument having pincers attached to one end thereof, and the calculating unit may further calculate shape change of the pincers by using the difference in distance according to movement of a movable marker attached to the pincers with respect to a criterion marker attached to the object.

The object may be a rod-shaped instrument having pincers attached to one end thereof, and the calculating unit may further calculate a rotating angle of the pincers by using the distance between a criterion marker attached to the object and a variable marker attached to the object.

The photographing unit may include a single camera, and the intrinsic parameter may be determined as a device characteristic of the camera and a point where the camera is located.

In another aspect, there is provided a localization sensing method using a 3-dimensional tracking system, which includes: photographing an object by using a camera; recognizing a marker attached to the object by binarizing an image of the photographed object; extracting a 2-dimensional coordinate of the recognized marker; and calculating a 3-dimensional coordinate from the extracted 2-dimensional coordinate by using parameters which are a device characteristic of the camera and a point where the camera is located.

The extracting a 2-dimensional coordinate of the recognized marker may include designating a range determined as a similar region in the binarized image as a group, and extracting a center of the designated group as a 2-dimensional coordinate of the marker.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
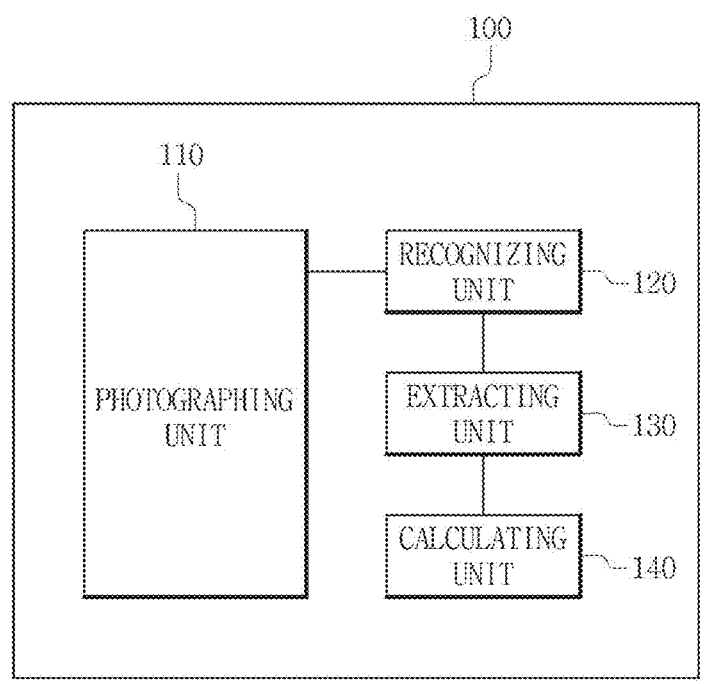
FIG. 1 is a block diagram showing a 3-dimensional tracking system according to an embodiment of the present disclosure.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Hereinafter, a 3-dimensional tracking system for surgery simulation according to the present disclosure and a localization sensing method using the same will be described in detail with reference to the accompanying drawings. A person having ordinary skill in the art can analogize various embodiments for the configuration of the present disclosure by referring to or modifying the drawings, but the present disclosure includes such various analogized embodiments and is not limited to the after-mentioned embodiments depicted in the drawings.

FIG. 1 is a block diagram showing a configuration of a 3-dimensional tracking system according to an embodiment of the present disclosure.

Referring to FIG. 1, the 3-dimensional tracking system 100 includes a photographing unit 110, a recognizing unit 120, an extracting unit 130 and a calculating unit 140.

The photographing unit 110 functions to photograph an object into an image and provide the image to the 3-dimensional tracking system 100. The photographing unit 110 may include a single camera or a plurality of cameras and photograph an object into an image by the camera. The photographing unit 110 may transmit the photographed image to the 3-dimensional tracking system 100 in real time according to the setting. An intrinsic parameter of the camera included in the photographing unit 110 may be determined as a device characteristic of the camera and a location where the camera is located. In other words, the photographing unit 110 may investigate an intrinsic characteristic of the camera and a location on a 3-dimensional space where the camera is located, according to camera calibration, and extract only the camera intrinsic parameter from the matrix obtained by the camera calibration.

An object photographed by the photographing unit 110 may be representatively a surgical instrument, which may include a rod-shaped instrument, an instrument having pincers attached to one end thereof, or their combination. In order to extract an image coordinate of the image obtained by the photographing unit 110, a marker serving as a display is attached to the object to be photographed, and at least one marker may be attached depending on a detecting method of the object. The marker may have various shapes, and the color of the marker may be a single color or many colors.

The recognizing unit 120 performs image binarization to the image obtained by the photographing unit 110 to recognize the marker attached to the photographed object.

The extracting unit 130 extracts a 2-dimensional coordinate of the marker recognized by the recognizing unit 120. As an embodiment, the extracting unit 130 may designate a range which is determined as a similar region in the binarized image, as a group (blob detection) and extract the center of the designated group as a 2-dimensional coordinate of the marker (calculation of marker center).

The calculating unit 140 operates to convert the 2-dimensional coordinate extracted by the extracting unit 130 into a 3-dimensional coordinate by using an intrinsic parameter determined by the camera of the photographing unit 110. At this time, the calculating unit 140 calculates a 3-dimensional coordinate by using a 3-dimensional location vector or a 3-dimensional direction vector of the marker attached to the object. Three or more markers may be attached to the photographed object, and the calculating unit 140 may calculate a 3-dimensional coordinate by substituting three or more 2-dimensional coordinates to a geometric algorithm.

Figure 2:
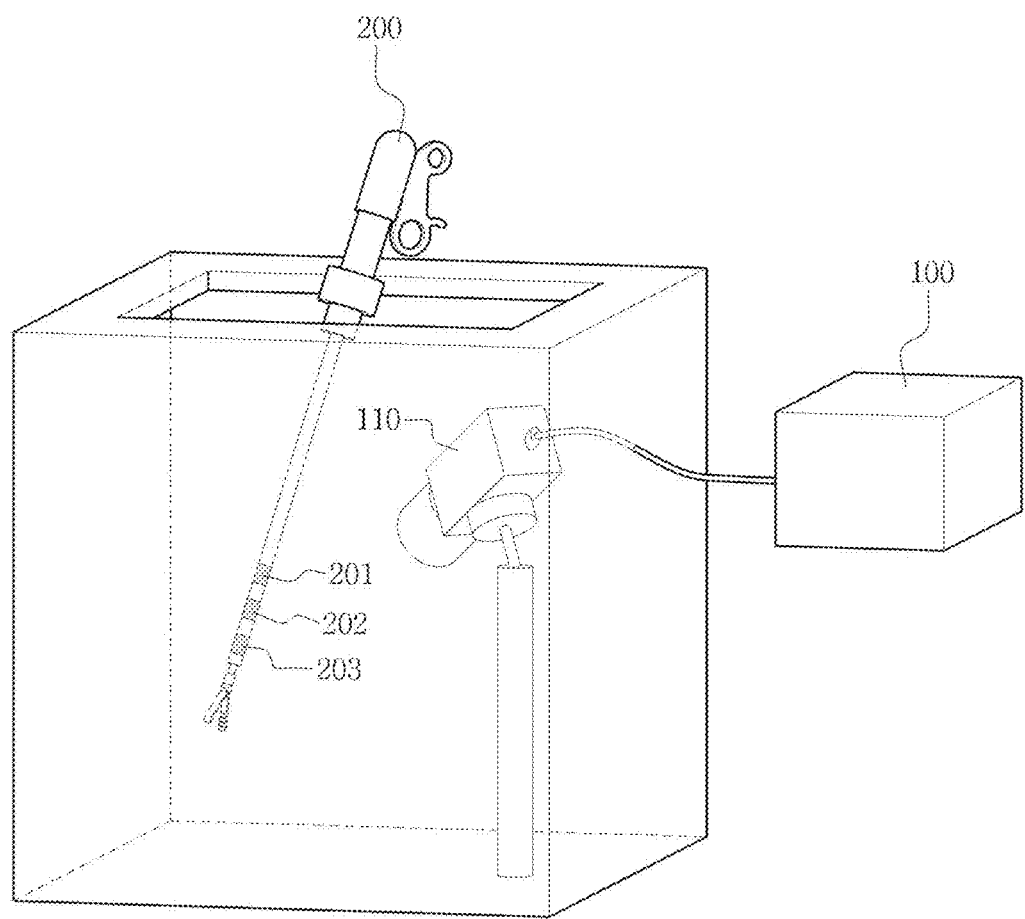
FIG. 2 is a perspective view showing an appearance of a system for tracking a 3-dimensional location of a surgical instrument according to an embodiment of the present disclosure.

FIG. 2 is a perspective view showing an appearance of a system for tracking a 3-dimensional location of a surgical instrument according to an embodiment of the present disclosure. Referring to FIG. 2, a single camera 100 serving as the photographing unit is connected to the 3-dimensional location tracking system 100, and the 3-dimensional location tracking system 100 may calculate 3-dimensional location of an object 200 by using the markers 201, 202 and 203 attached to the object 200 which is a surgical instrument. In addition, pincers may be attached to one end of the photographed object, and the calculating unit 140 may further calculate shape changes such as movement of the pincers and angle of opening or closing pincers, by using the difference in distance according to the movement of a movable marker at a moving point with respect to a criterion marker at a fixed point attached to the object.

Figure 3A:
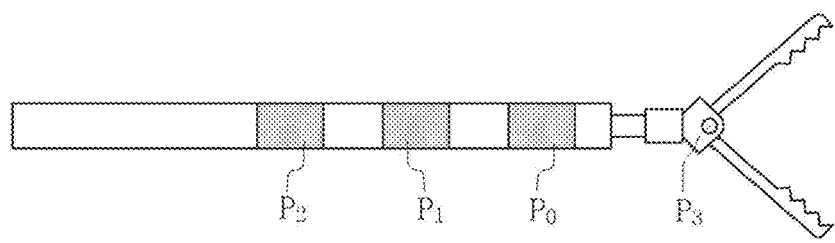
FIGS. 3a and 3b are schematic views showing a marker attached to the surgical instrument according to an embodiment of the present disclosure.
Figure 3B:
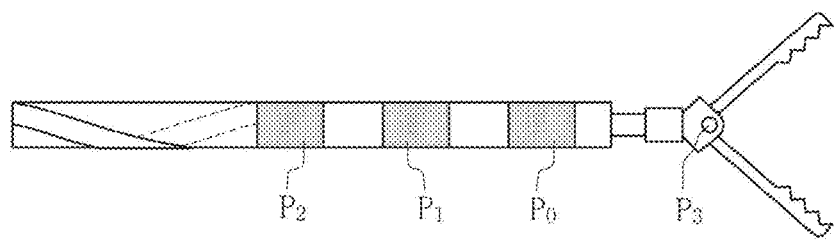

FIGS. 3a and 3b are schematic views showing a marker attached to the surgical instrument according to an embodiment of the present disclosure. Referring to FIG. 3a, among markers attached on the surgical instrument, P0 is a marker at a criterion point. At least one marker of FIG. 3a may be defined as P0=t, P1=t+λ1, ..., Pi=t+λi (I=0, 1, 2, 3). At this time, λi is a distance between P0 and Pi. By using the 2-dimensional image coordinate expressed by (ui, vi, 1), Equation 1 may be expressed.

$$[0 \ 0 \ 1][t+\lambda_i r]\begin{bmatrix} u_i \\ v_i \\ 1 \end{bmatrix} = K^c(t+\lambda_i r) \quad \text{Equation 1}$$

At this time, Kc is a 3×3 matrix of Kc=diag (f, f, 1), which represents a camera intrinsic parameter.

A 3-dimensional location vector t of the object and a 3-dimensional direction vector r of the object may be expressed by Equation 2.

$$[A_r \ A_t]\begin{bmatrix} r \\ t \end{bmatrix} = 0 \quad \text{Equation 2}$$

At this time, the matrix A is a 2n×6 matrix, and Equation 2 may be optimized into Equation 3 below.

$$\min\|A_r r + A_t t\| \text{ subject to } r^T r = 1 \quad \text{Equation 3}$$

An eigenvalue is calculated by using the value optimized in Equation 3 and by using Equation 4 below, and at value which is a 3-dimensional location vector of the object may be calculated.

$$t = -(A_t^T A_t)^{-1} A_t^T A_r r \quad \text{Equation 4}$$

By the above process, the calculating unit 140 may calculate a 3-dimensional space coordinate of the object by using the 2-dimensional coordinate of the object extracted by the extracting unit 130.

In addition, the shape change according to the movement of the pincers may be calculated according to Equation 5 below by using the distance between P0 which is the criterion marker attached to the rod and P3 which is the variable marker attached to the pincers. After distinct points of the object are tracked as in the above method, Equation 2 may be arranged by using the correlation between the distance between P0 which is the criterion marker attached to the rod and P3 which is the variable marker attached to the pincers and the opening angle of the pincers, thereby obtaining Equation 5 below.

$$\begin{pmatrix} \lambda_3 f & 0 & -\lambda_3 u_3 & f & 0 & -u_3 \\ 0 & \lambda_3 f & -\lambda_3 v_3 & 0 & f & -v_3 \end{pmatrix} \begin{pmatrix} r_x \\ r_y \\ r_z \\ t_x \\ t_y \\ t_z \end{pmatrix} = 0 \quad \text{Equation 5}$$

In Equation 5, if λ3 is arranged, Equations 6 and 7 below may be calculated.

$$\lambda_3 = \frac{u_3 t_z - f t_x}{f r_x - u_3 r_z} \quad \text{Equation 6}$$

$$\lambda_3 = \frac{v_3 t_z - f t_y}{f r_y - v_3 r_z} \quad \text{Equation 7}$$

Equation 6 is a math figure for calculating λ3 by using a x coordinate of the image, and Equation 7 is a math figure for calculating λ3 by using a y coordinate of the image. If the angle of the pincers is calculated by using the 1-dimensional relation between the λ3 value obtain by the above method and the angle of the pincers, the shape change according to the movement of the pincers may be calculated.

Referring to FIG. 3b, a band is further attached to the object of FIG. 3a as an additional marker. The band is attached while rotating to surround the object. Similar to the shape change calculating method of the pincers, a rotating angle is calculated by using the distance between P0 which is the criterion marker and the center of the band which is the additional marker. The distance may be matched with an angle between 0 degree and 360 degrees while the rotating angle is calculated. For example, in a case where the diastase is 10, the rotating angle according to the measured distance may be calculated while matching the range from 0 degree to 360 degree with the range from 0 to 10.

Figure 4:
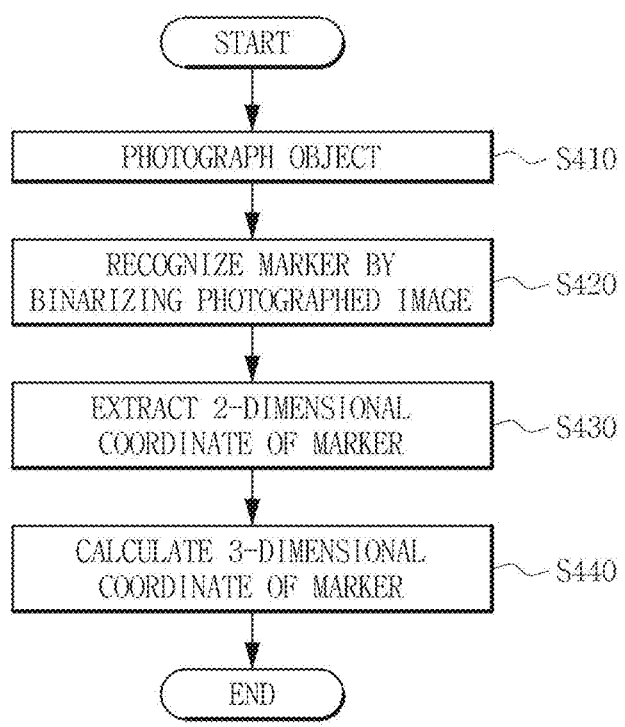
FIG. 4 is a flowchart for illustrating a process of detecting a location of an object by using the 3-dimensional tracking system according to an embodiment of the present disclosure.

FIG. 4 is a flowchart for illustrating a process of detecting a location of an object by using the 3-dimensional tracking system according to an embodiment of the present disclosure.

Referring to FIG. 4, an object is photographed by using the 3-dimensional tracking system (S410), and the photographed image is binarized to recognize a marker (S420). A 2-dimensional coordinate is extracted from the recognized marker (S430), and a 3-dimensional coordinate is calculated from the 2-dimensional coordinate to track 3-dimensional location of the object (S440). The above calculation requires an intrinsic parameter of the photographing unit, and the intrinsic parameter may extract an intrinsic feature of the camera by means of camera calibration. In addition, in the process of extracting a 2-dimensional coordinate of the marker, a range which is determined as a similar region in the binarized image may be designated as a group (blob detection) so that the center of the designated group may be extracted as a 2-dimensional coordinate of the marker.

The 3-dimensional tracking system may be used for recognizing three or more markers attached to a rod-shaped object to extract 3-dimensional location of the rod-shaped object, and the shape changes of the pincers such as movement of the pincers and angle of the opening or closing pincers may be further calculated by using the difference in distance according to the movement of a movable marker with respect to a criterion marker attached to the pincers-like object.

The 3-dimensional tracking system for tracking a 3-dimensional location of a surgical instrument by using a camera according to at least one embodiment of the present disclosure configured as above and the localization sensing method using the same enables to efficiently construct a location tracking system with low costs and allows 3-dimensional coordinates and shape changes of an object to be detected.

In the 3-dimensional tracking system described above and the localization sensing method using the same, the configuration and method of the above embodiments are not limitedly applied, but the embodiments may be entirely or selectively combined to make various modifications.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A 3-dimensional tracking system, comprising:
    a photographing unit for photographing an object;
    a recognizing unit for recognizing a marker attached to the object by binarizing an image of the object photographed by the photographing unit;
    an extracting unit for extracting a 2-dimensional coordinate of the marker recognized by the recognizing unit; and
    a calculating unit for calculating a 3-dimensional coordinate from the 2-dimensional coordinate of the marker by using an intrinsic parameter of the photographing unit,
    wherein the object is a rod-shaped instrument; and
    wherein the calculating unit calculates a 3-dimensional coordinate from 2-dimensional coordinates of three or more markers attached to the object,
    wherein the object is a rod-shaped instrument having pincers attached to one end thereof, and
    wherein the calculating unit further calculates shape change of the pincers by using the difference in distance according to movement of a movable marker attached to the pincers with respect to a criterion marker attached to the object.

2. The 3-dimensional tracking system according to claim 1, wherein the calculating unit calculates the 3-dimensional coordinate by using a 3-dimensional location vector or 3-dimensional direction vector of the marker attached to the object.

3. The 3-dimensional tracking system according to claim 1, wherein the calculating unit further calculates a rotating angle of the pincers by using the distance between a criterion marker attached to the object and a variable marker attached to the object.

4. The 3-dimensional tracking system according to claim 1, wherein the photographing unit includes a single camera, and
wherein the intrinsic parameter is determined as a device characteristic of the camera and a point where the camera is located.

5. The 3-dimensional tracking system according to claim 1, wherein the extracting unit designates a range determined as a similar region in the binarized image as a group, and extracts a center of the designated group as a 2-dimensional coordinate of the marker.

6. A localization sensing method using a 3-dimensional tracking system, comprising:
photographing an object by using a camera, wherein the object is a rod-shaped instrument having pincers attached to one end thereof;
recognizing a marker attached to the object by binarizing an image of the photographed object;
extracting a 2-dimensional coordinate of the recognized marker;
calculating a 3-dimensional coordinate from the extracted 2-dimensional coordinate by using parameters which are a device characteristic of the camera and a point where the camera is located,
calculating a 3-dimensional coordinate from 2-dimensional coordinates of three or more markers attached to the object, and
calculating shape change of the pincers by using the difference in distance according to movement of a movable marker attached to the pincers with respect to a criterion marker attached to the object.

7. The localization sensing method using a 3-dimensional tracking system according to claim 6, wherein the extracting a 2-dimensional coordinate of the recognized marker includes designating a range determined as a similar region in the binarized image as a group and extracting a center of the designated group as a 2-dimensional coordinate of the marker.

8. The localization sensing method using a 3-dimensional tracking system according to claim 6, wherein the recognizing a marker attached to the object includes recognizing three or more markers attached to a rod-shaped object.

9. The localization sensing method using a 3-dimensional tracking system according to claim 6, wherein the calculating a 3-dimensional coordinate further includes calculating a rotating angle of the object by using the distance between a criterion marker attached to the object and a variable marker attached to the object.

* * * * *